US008556481B2

(12) United States Patent
Abe

(10) Patent No.: US 8,556,481 B2
(45) Date of Patent: Oct. 15, 2013

(54) VEHICLE LIGHTING DEVICE

(75) Inventor: Toshiya Abe, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 13/602,869

(22) Filed: Sep. 4, 2012

(65) Prior Publication Data

US 2013/0058118 A1 Mar. 7, 2013

(30) Foreign Application Priority Data

Sep. 5, 2011 (JP) ................................ 2011-193074

(51) Int. Cl.

| | |
|---|---|
| ***F21V 21/14*** | (2006.01) |
| ***F21V 19/02*** | (2006.01) |
| ***F21V 19/00*** | (2006.01) |
| ***B60Q 1/00*** | (2006.01) |
| ***B60Q 3/00*** | (2006.01) |
| ***F21S 8/10*** | (2006.01) |

(52) U.S. Cl.
USPC ............ 362/523; 362/519; 362/530; 362/531

(58) Field of Classification Search
USPC ................................ 362/519, 523, 531, 530
See application file for complete search history.

(56) References Cited

U.S. PATENT DOCUMENTS

| | | | | |
|---|---|---|---|---|
| 7,241,038 | B2 * | 7/2007 | Naniwa et al. | 362/525 |
| 7,762,700 | B2 * | 7/2010 | Luo et al. | 362/545 |
| 7,985,014 | B2 * | 7/2011 | Tsukamoto | 362/549 |
| 2002/0041499 | A1 * | 4/2002 | Pederson | 362/545 |
| 2006/0092657 | A1 * | 5/2006 | Naniwa et al. | 362/543 |
| 2009/0154189 | A1 * | 6/2009 | Cho et al. | 362/547 |
| 2009/0296416 | A1 * | 12/2009 | Luo et al. | 362/487 |
| 2009/0316384 | A1 * | 12/2009 | Kanayama et al. | 362/84 |
| 2010/0060127 | A1 * | 3/2010 | Sazuka et al. | 313/1 |
| 2010/0195345 | A1 * | 8/2010 | Sugie | 362/516 |
| 2010/0253223 | A1 * | 10/2010 | Inoue et al. | 315/82 |
| 2011/0149586 | A1 * | 6/2011 | Schug et al. | 362/519 |
| 2011/0199778 | A1 * | 8/2011 | Okubo | 362/539 |

FOREIGN PATENT DOCUMENTS

| | | |
|---|---|---|
| JP | 2010-086944 A | 4/2010 |

* cited by examiner

*Primary Examiner* — David J Makiya
*Assistant Examiner* — Bryon T Gyllstrom
(74) *Attorney, Agent, or Firm* — Foley & Lardner LLP

(57) ABSTRACT

In present invention, the vehicle lighting device includes a heat sink; a light emitting element that is mounted on the heat sink; and a reflector that is disposed on a side of a light emission surface of the light emitting element, the reflector being adapted to reflect light from the light emitting element in a first direction. The heat sink includes: a heat sink main body; and a plate-shaped light source mount member which is protruded from the heat sink main body in the first direction, and on which the light emitting element is to be disposed. A light source is disposed to tit with respect to a horizontal surface in a widthwise direction of the vehicle when a vehicle lighting device is mounted on the vehicle.

1 Claim, 6 Drawing Sheets

(a)

(b)

(a)

(b)

(a)

(b)

VEHICLE LIGHTING DEVICE

CROSS REFERENCE TO RELATED APPLICATIONS

This application claims priority of Japanese Patent Application No. 2011-193074 filed on Sep. 5, 2011. The content of this application is incorporated herein by reference in their entirety.

BACKGROUND OF THE INVENTION

1. Field of the Invention

The present invention is directed to a vehicle lighting device and further relates to a vehicle lighting device in which a light emitting element is employed as a light source.

2. Description of the Related Art

As a vehicle lighting device of such type, it has been conventionally known that in a lamp room made of a housing and a front lens, there are provided a chip-shaped light emitting diode (a light emitting element) and a reflector that is disposed on a light emission surface side of the light emitting diode, the reflector being adapted to reflect light from the light emitting diode to the font lens side.

In this case, the light emitting diode is mounted on a heat sink, and a heat generated by turning on the light emitting diode is radiated to the heat sink so as to thereby prevent a change in characteristics which is exerted by the heat from the light emitting diode.

In addition, the heat sink is comparatively formed to be large in order to increase its heat dissipation effect, and is configured so that the light emitting diode is mounted on a plate-shaped portion that is protruded at a part of the heat sink. In other words, the heat sink is made of: a heat sink main body that is supported with respect to a housing; and a plate-shaped light source mount member which is protruded from the heat sink main body and on which the light emitting diode is to be disposed. It is to be noted that the light source mount member is disposed in parallel to a horizontal surface in a widthwise direction of a vehicle in a case where the vehicle lighting device is mounted on the vehicle.

A publicly known technique that is associated with the present invention can be found in Japanese Unexamined Patent Application Publication No. 2010-86944 or the like, for example.

However, in the vehicle lighting device that is configured as described above, the light source mount member is a so called cantilever structure, so that it is structured to easily slacken with respect to acceleration in a direction from top face to back face thereof.

Therefore, in a case where the vehicle lighting device is mounted on a vehicle, vibration in a vertical direction of the vehicle easily resonates with the light source mount member, the light emitting diode that is mounted on the light source mount member also vibrates, and as a result, there has occurred an inconvenience that a distortion in optical distribution of the light from the light emitting diode easily occurs.

The present invention has been made in view of such a circumstance, and it is an object of the present invention to provide a vehicle lighting device that is structured in such a manner as to be able to restrain vibration of a light source mount member of a heat sink adapted to mount a light emitting element.

SUMMARY OF THE INVENTION

In order to achieve such an object, according to the present invention, in a case where a vehicle lighting device is mounted on a vehicle, a light source mount member is disposed to tilt with respect to a horizontal surface of a widthwise direction of the vehicle so as to thereby restrain vibration of the light source mount member, exerted by vibration of the vehicle. In this manner, vibration of a light emitting element can be restrained, and light distribution distortion of the light from the light emitting element can be avoided.

The present invention is recognized by the characterizing features as set forth below. (1) A vehicle lighting device of the present invention is characterized by comprising: a heat sink; a light emitting element that is mounted on the heat sink; and a reflector that is disposed on a light emission surface side of the light emitting element, the reflector being adapted to reflect in a first direction, light from the light emitting element, wherein: the heat sink includes: a heat sink main body and a plate-shaped light source mount member which is protruded in the first direction from the heat sink main body, and on which the light emitting element is to be disposed, and the light source mount member is disposed to tilt with respect to a horizontal surface in a widthwise direction of a vehicle, when the vehicle lighting device is mounted on the vehicle.

(2) The vehicle lighting device of the present invention is characterized in that, in the features of (1), the light emitting element is disposed at the light source mount member so that the light emission surface of the light emitting element is substantially flush with the horizontal surface in the widthwise direction of the vehicle, when the vehicle lighting device is mounted on the vehicle.

According to the thus configured vehicle lighting device, there can be provided a structure that is capable of, with respect to vibration of a vehicle, restraining vibration of a light source mount member of a heat sink adapted to mount a light emitting element.

DESCRIPTION OF THE PREFERRED EMBODIMENTS

Figure 1:
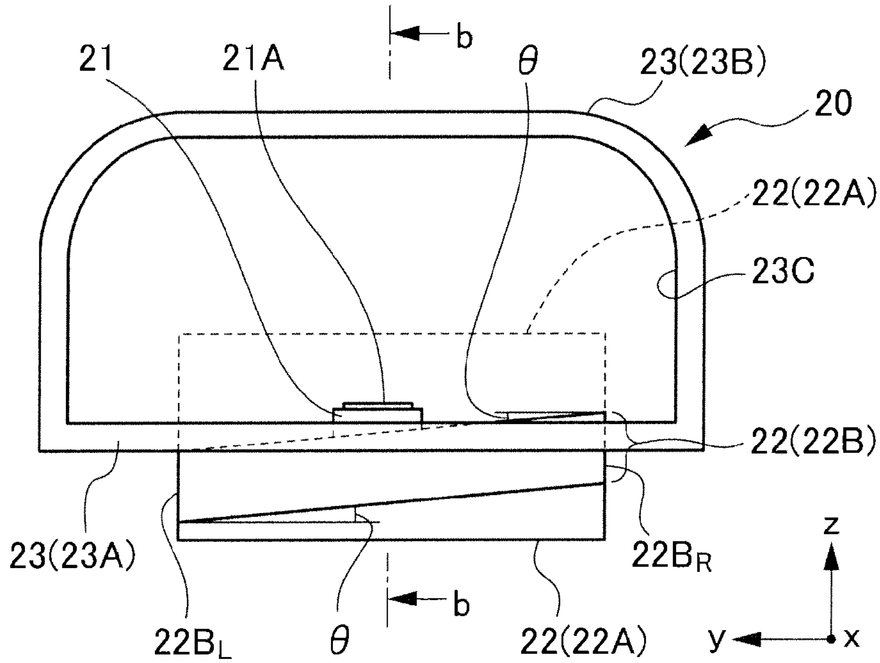
FIG. 1 is a structural view showing the essential portions of a vehicle lighting device of the present invention, wherein FIG. 1(*a*) is a front view, and FIG. 1(*b*) is a sectional view.
Figure 1:
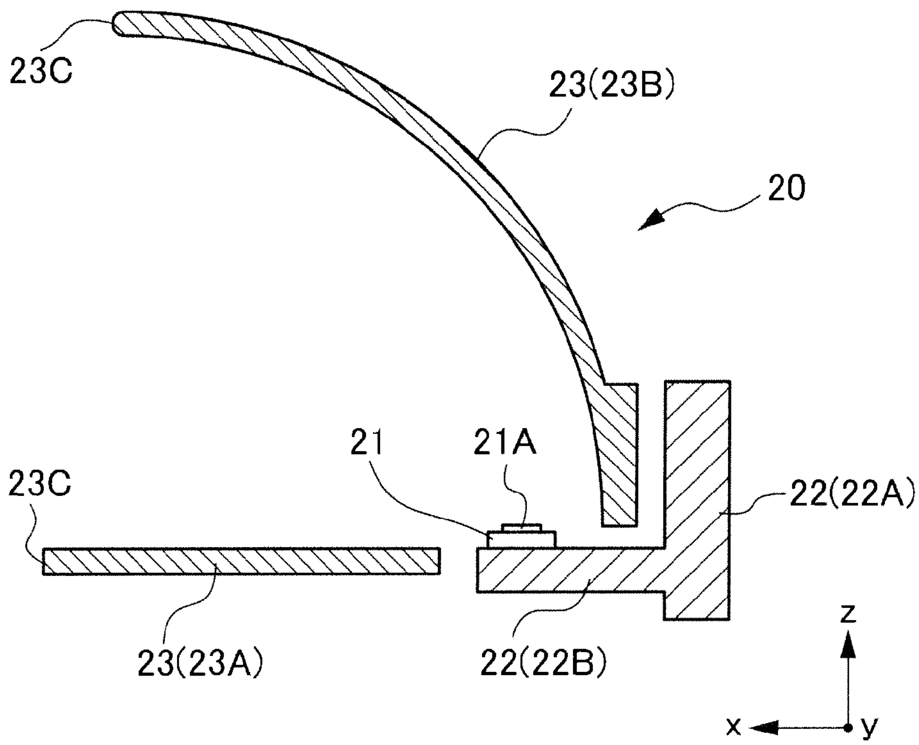

Hereinafter, modes for carrying out the present invention (hereinafter, referred to as the embodiments) will be described in detail with reference to the accompanying drawings. It is to be noted that throughout description of the embodiment, same constituent elements are designated by same reference numerals.

First Embodiment

Figure 2:
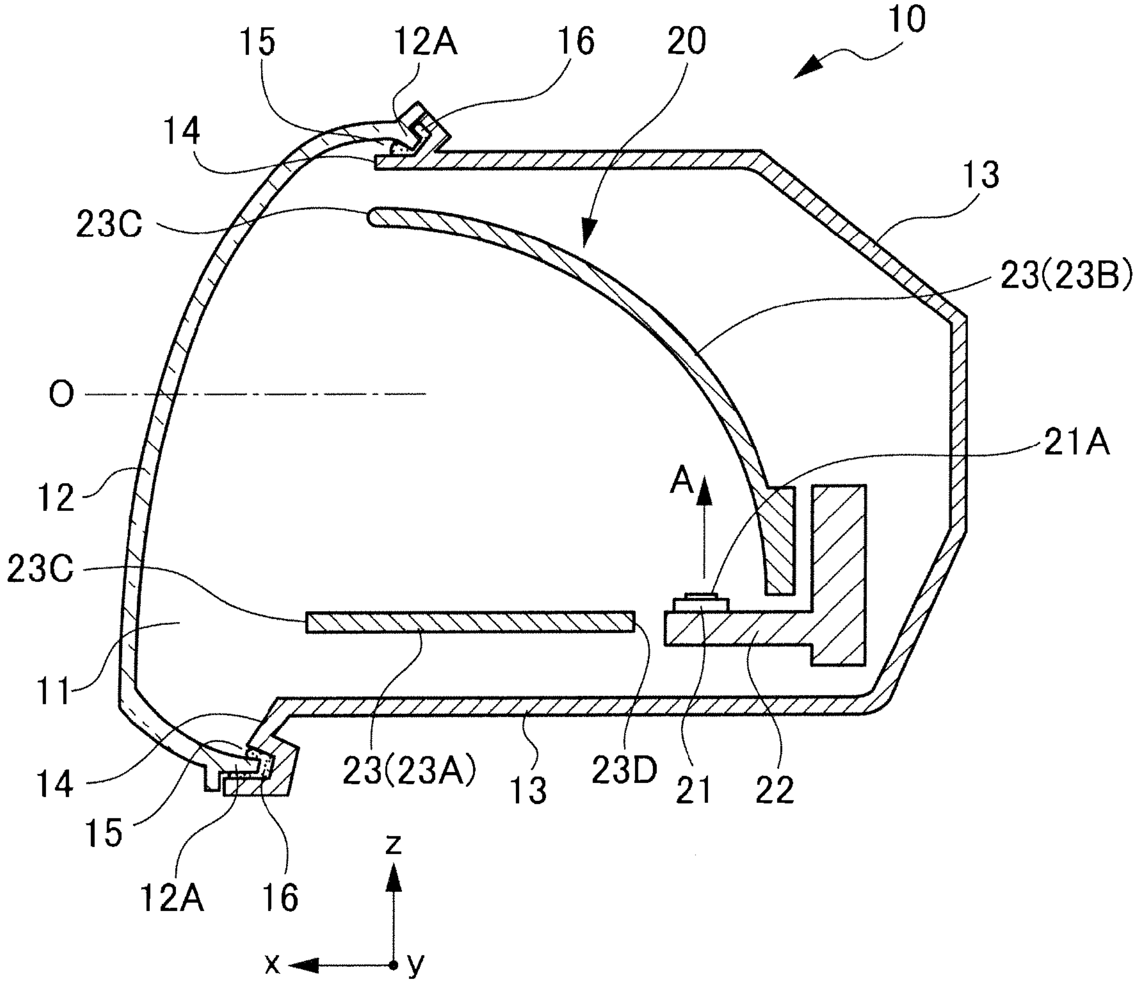
FIG. 2 is a sectional view showing the entirety of the vehicle lighting device of the present invention.

FIG. 2 is a sectional view showing schematics of a vehicle lighting device according to a first embodiment of the present invention. FIG. 2 shows a vehicle lighting device 10 made of a front lamp (a headlamp), for example. In FIG. 2, the x-direction, y-direction, and z-direction respectively indicate a forward direction, a widthwise direction, and a vertical direction, in a case where the vehicle lighting device 10 is mounted on a vehicle.

In FIG. 2, the vehicle lighting device 10 is a device in which a lamp room 11 thereof is defined by a front lens 12 and a housing 13. The front lens 12 is disposed on a front side of a vehicle (on the left side shown in the figure), and the housing 13 is disposed on a rear side of the vehicle (on the right side shown in the figure).

The housing 13 has an opening 14 on a front part of the vehicle, and in an opening edge of the opening, a groove portion 15 is formed in such a manner as to insert a peripheral edge portion 12A of the front lens 12. A hot melt 16 is applied in advance to the groove portion 15 of the opening edge of the housing 13, and by means of this hot melt 16, the peripheral edge portion 12A of the front lens 12 is securely fixed, making it possible to ensure a sealing property of preventing entry of moisture.

In the lamp room 11 of the vehicle lighting device 10, a lamp 20 is arranged. This lamp 20 is made of a light emitting element 21, a heat sink 22, and a reflector 23, for example.

The light emitting element 21 is formed in a chip shaped, and on a surface thereof, a light emission surface 21A is formed and configured. This light emitting element 21 is mounted on the heat sink 22 that is supported with respect to the housing 13, the light emitting element being adapted to be disposed in the lamp room 11. The heat sink 22 radiates a heat that is generated while the light emitting element 21 is driven, so as to thereby prevent degradation in characteristics which is exerted by a heat from the light emitting element 21. A further detailed description of the heat sink 22 will be given later. The light emitting element 21 is disposed on a lower side of the lamp room 11 so that the light emitting surface 21A is oriented to an upper side of the lamp room 11. In other words, the light emitting element 21 is disposed so that an emission direction of the light from the light emission surface 21A (indicated by the arrow A in the figure) crosses an optical axis of the front lens 12 (indicated by single dotted chain line O in the figure) without the light emission surfaces 21A being directly opposed to the front lens 12.

The reflector 23 has: a flat portion 23A that is substantially flush with the light emission surface 21A of the light emitting element 21; and a curved portion 23B that is formed on an upper side with respect to the light emission surface 21A of the light emitting element 21, and an opening 23C is formed and configured on the side of the front lens 12. An opening portion 23D adapted to expose the light emitting element 21 is provided at a site on which the light emitting element 21 of the flat portion 23A of the reflector 23 is to be disposed. In this manner, after the heat sink 22 adapted to mount the light emitting element 21 thereon has been supported by the housing 13, the reflector 23 is fixed to the housing 13, thereby making it possible to dispose the light emitting element 21 at a predetermined site with respect to the reflector 23.

The curved portion 23B of the reflector 23 has a free curved surface that is formed by using a combination of rotational parabolic surface or a parabolic columnar surface or the like, for example. This curved portion 23B is configured with a light reflection surface in which light reflection processing is carried out as to an interior face that is opposite to the light emission surface 21A of the light emitting element 21. The curved portion 23B of the reflector 23 is adapted to reflect the light from the light emission surface 21A of the light emitting element 21 on the light reflection surface so as to emit the reflected light to the side of the front lend 12.

FIG. 1(*a*) and FIG. 1(*b*) are views showing a case in which the lamp 20 is removed from the vehicle lighting device 10, wherein FIG. 1(*a*) is a front view when seen from the side of the opening 23C of the reflector 23, and FIG. 1(*b*) is a sectional view taken along the line b-b of FIG. 1(*a*). It is to be noted that the sectional view of FIG. 1(*b*) coincides with a sectional view of the lamp 20 shown in FIG. 2.

As shown in FIG. 1(*a*) and FIG. 1(*b*), the heat sink 22 is made of: a heat sin main body 22A that is supported with respect to the housing 13; and a plate-shaped light source mount member 22B which is protruded from the heat sink main body 22A and on which the light emitting diode 21 is to be disposed. The heat sink main body 22A is disposed on a rear side of the reflector 23, for example; has a comparatively large capacity; and is structured in such a manner that a surface area is increased by a heat radiation fin, although not shown, thereby increasing a heat radiation effect. In addition, the light source mount member 22B is formed as a plate-shaped member that is protruded from the heat sink main body 22A to the side of the opening 23C of the reflector 23. This light source mount member 22B is mounted integrally with the heat sink member 22A, for example, and is made of a metal or a resin material with its high heat conductivity. In this manner, the light source mount member 22B is a so called cantilever structure with respect to the heat sink main body 22A. The light source mount member 22B is adapted to mount the light emitting diode 21 thereon, as described above, a part of the heat from the light emitting diode 21 is thermally radiated by means of the light source mount member 22B, and the remaining heat that is a majority of the generated heat is transmitted to the side of the heat sink main body 22A so as to be thermally radiated by means of the heat sink main body 22A.

Herein, the light source mount member 22B, as shown in FIG. 1(*a*), is structured to be mounted on the heat sink main body 22A in such a manner that a side end face on the right side in the figure (reference numeral 22BR in the figure) is formed to be higher than a side end face on the left side in the figure (reference numeral 22BL in the figure) so that a surface on which the light emitting diode 21 is to be mounted has a tilt of an angle $\theta$. In other words, the light source mount member 22B is configured to be mounted on the heat sink member 22A so as to be disposed to tilt at an angle with respect to a horizontal surface in a widthwise direction of the vehicle (on the x-y plane in the figure) in a case where the vehicle lighting device 10 is mounted on a vehicle. Herein, the aforementioned angle $\theta$ is set in a range of 0 degree<$\theta$<45 degrees, or preferably, in a range of 5 degrees<$\theta$<15 degrees. It is to be noted that the light emitting diode 21 is disposed on the light source mount member 22B so that the light emission surface 21A is substantially flush with the horizontal surface in the widthwise direction of the vehicle (the x-y plane in the figure) in the vehicle lighting device 10 is mounted on a vehicle in spite of the fact that the light source mount member 22B is disposed to be tilted. In this manner, optical distribution of the light from the light emitting diode 21 can be made for the existing reflector 23.

Figure 3:
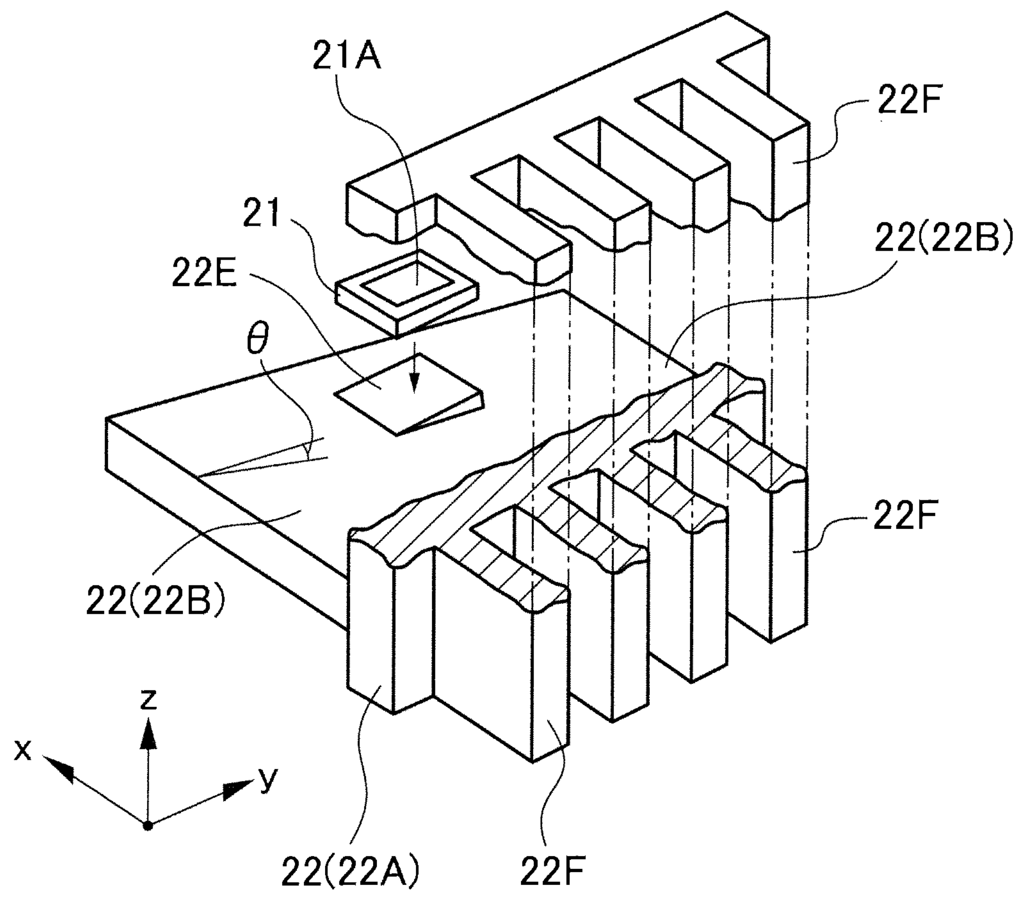
FIG. 3 is a partially cutaway perspective view showing a heat sink that is included in the vehicle lighting device of the present invention.

FIG. 3 is a partially cutaway perspective view showing the thus configured heat sink 22. As shown in FIG. 3, the light source mount member 22B is mount on the heat sink main body 22A so that a surface on which the light emitting diode 21 is to be mounted has a tilt of an angle $\theta$ with respect to a horizontal surface in a widthwise direction of a vehicle (in the x-y plane in the figure) and then the light emitting diode 21 is mounted via a base portion 22E that is integrally provided on the light source mount member 22B, for example, whereby the light emission surface 21A is substantially flush with the horizontal surface in the widthwise direction of the vehicle (the x-y plane in the figure). It is to be noted that on an opposite face to a face on which the light source mount member 22B of the heat sink main body 22A is to be formed, for example, a plurality of heat radiation fins 22F are formed which is provided in parallel to each other in the widthwise direction of the vehicle (in the y direction in the figure), and which extends in a vertical direction of the vehicle (in the z direction in the figure).

Figure 4:
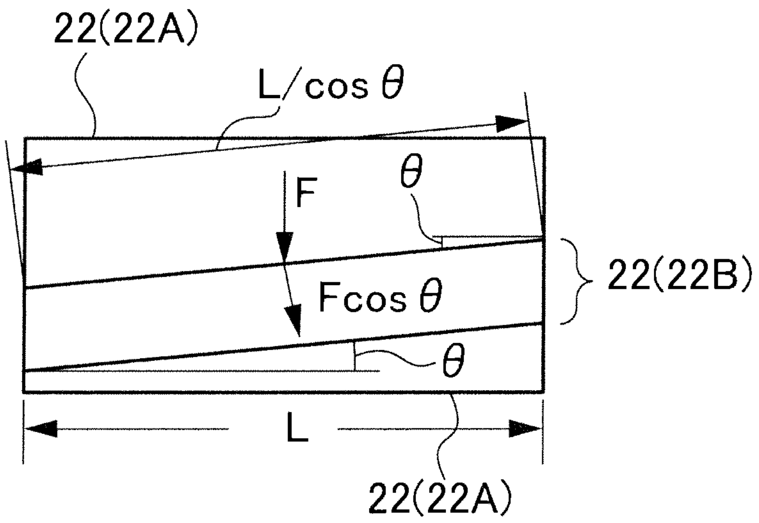
FIG. 4 is an explanatory view showing an advantageous effect of the present invention.

In this manner, in a case where the light source mount member 22B is disposed to tilt with respect to the horizontal surface in the widthwise direction of the vehicle in a state in which the vehicle lighting device 10 is mounted on the vehicle, the light source mount member 22B can be configured in such a manner as to be able to restrain its own vibration with respect to vibration of the vehicle. FIG. 4 is a view when the heat sink 22 made of the heat sink main body 22A and the light source mount member 22B is seen from the front side of the vehicle, wherein the light emitting diode 21 is not shown. As is evident from FIG. 4, the plate-shaped light source mount member 22B is disposed integrally with the heat sink main body 22A so as to have a tilt of an angle θ (0 degree<θ<45 degrees) with respect to the horizontal surface in the widthwise direction of the vehicle in a case where the vehicle lighting device 10 is mounted on the vehicle.

In this situation, in a case where an external force F (that is equivalent to vibration in the vertical direction of a vehicle) is acted in the vertical direction shown in the figure, a divisional force that acts in a direction of slackening the light source mount member 22B made of a cantilever structure is obtained as F cosine θ. Herein, a relationship of 0 degree<θ<45 degrees is established; and therefore, a relationship cosine θ<1 is established, and F cosine θ is obtained to be smaller than F. In this manner, the force that acts in the direction of slackening the light source mount member 22B made of a cantilever structure can be reduced. In addition, as is the case with the conventional art, in a case where a width of the light source mount member 22B is defined as L in a case where the light source mount member 22B made of a cantilever structure is disposed in parallel to the horizontal surface in the widthwise direction of the vehicle, as shown in FIG. 4 in a case where the light source mount member 22B is caused to tilt at an angle of θ, the width of the light source mount member 22B is obtained as L/cosine θ, which can be greater than L, making it possible to increase rigidity.

From the foregoing descriptive matter, in a case where the light source mount member 22B is disposed to tilt with respect to the horizontal surface in the widthwise direction of the vehicle, an effect of the external force F is alleviated, and rigidity can be increased; and therefore, there can be provided a structure that is capable of restraining vibration of the light source mount member 22B adapted to mount the light emitting diode 21 thereon. Thus, vibration of the light emitting diode 21 that is mounted on the light source mount member 21 can be restrained, making it possible to avoid and distortion in optical distribution of the light from the light emitting diode 21 as well. In addition, there can be provided a structure that is capable of restraining vibration of the light source mount member 22B adapted to mount the light emitting diode 21 thereon; and therefore, for example, the light source mount member 22B can be formed in such as manner as to be reduced in thickness, or alternatively, the light source mount member 22B made of a cantilever structure can be increased in length, and an advantageous effect of improving a degree of freedom in design of the light source mount member 22B is attained.

Figure 7:
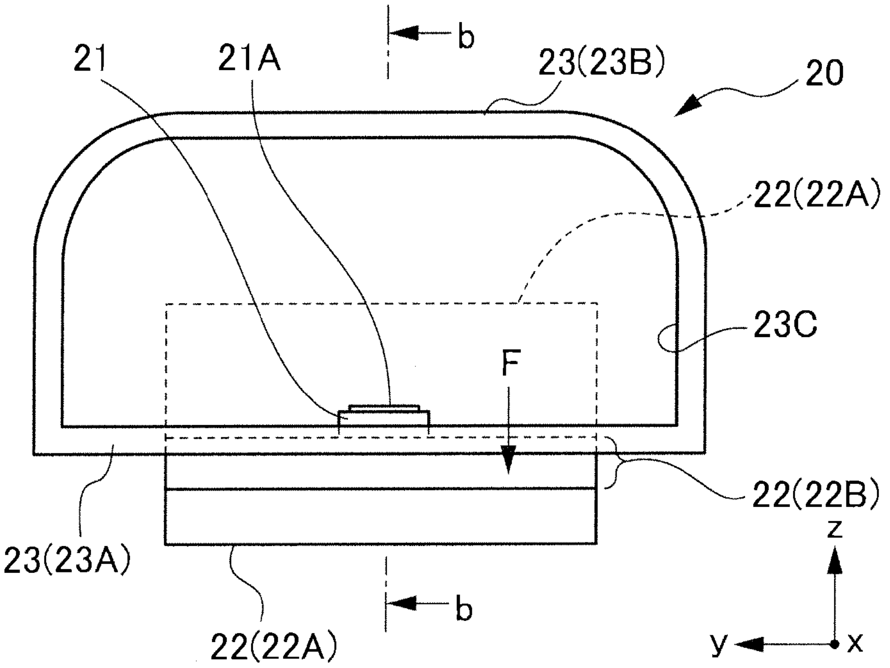
FIG. 7 is a comparative view showing the essential portions of a vehicle light device to which the present invention is not applicable.
Figure 7:
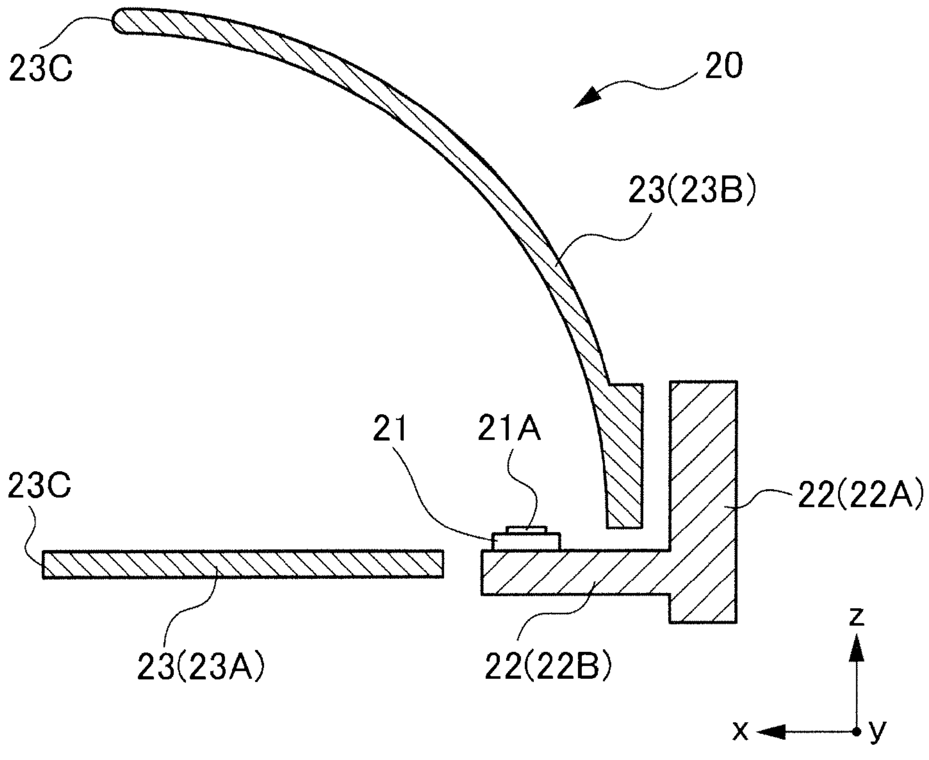

Namely, FIG. 7(*a*) and FIG. 7(*b*) are views each showing a configuration of the heat sink 22 of the lamp 20 shown in the first embodiment in which in a case where the vehicle lighting device 10 is mounted on a vehicle, the light source mount member 22B is disposed in parallel to the horizontal surface in the widthwise direction of the vehicle (in the x-y plane in the figure). In this situation, in a case where an external force F (that is equivalent to vibration in the vertical direction of the vehicle) is acted in the vertical direction shown in the figure, this external force F is not reduced, and serves as a force to slacken the light source mount member 22B of a cantilever structure as it is, and there occurs an inconvenience that the light source mount member 22B easily resonates with such vibration.

As is evident from the foregoing descriptive matter, according to the vehicle lighting device of the present invention, there can be provided a structure that is capable of, with respect to vibration of a vehicle, restraining vibration of the light source mount member 22B of the heat sink 22 adapted to mount a light emitting diode.

Second Embodiment

The light emitting diode 21 shown in the first embodiment is disposed on the light source mount member 22B so that the light emission surface 21A is substantially flush with the horizontal surface in the widthwise direction of the vehicle in a case where the vehicle lighting device 10 is mounted on the vehicle. However, without being limitative thereto, of course, as is the case with the light source mount member 22B, the light emitting diode 21 may be disposed on the light source mount member 22B so that the light emission surface 21A tilts with respect to the horizontal surface in the widthwise direction of the vehicle (the x-y plane in the figure). In this case, light from the light emitting diode can be emitted to the front lens side in a predetermined light distribution state by changing a design of a light reflection surface of a reflector. From the foregoing scope of work, it is needless to say that the light emitting diode 21 may be mounted to tilt in a forward/backward direction of a vehicle (in the x direction in the figure).

Third Embodiment

While the heat sink 22 shown in the first embodiment has been described as a heat sink in which the heat sink main body 22A and the light source mount member 22B are integrally provided respectively, of course, these heat sink main body 22A and light source mount member 22B may be separately formed respectively, and for example, these elements may be configured to be combined with each other by means of screw or the like.

Fourth Embodiment

Figure 5:
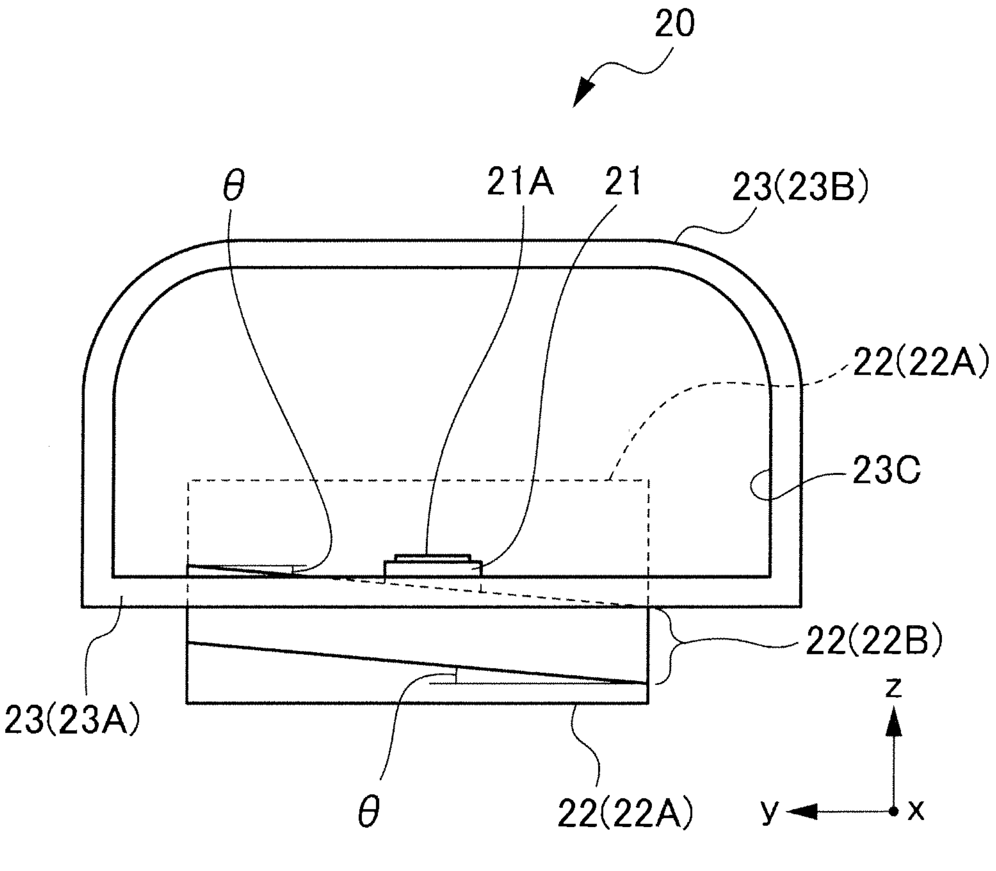
FIG. 5 is a view corresponding to FIG. 1(*a*), and is a view showing another embodiment of the present invention.

In the heat sink 22 shown in the first embodiment, in a case where the vehicle lighting device 10 is mounted on the vehicle, the light source mount member 22B adapted to mount the light emitting diode 21 is caused to tilt so that the vehicle outside is high and the vehicle inside is low, for example, with respect to the horizontal surface in the widthwise direction of the vehicle. However, without being limitative thereto, as shown in FIG. 5 that is drawn in association with FIG. 1(*a*), it is needless to say that the light source mount member 22B may be caused to tilt so that the vehicle outside is low and the vehicle inside is high with respect to the horizontal surface in the widthwise direction of the vehicle. Even in such a case, an advantageous effect similar to the above described effect can be obtained.

Fifth Embodiment

Figure 6:
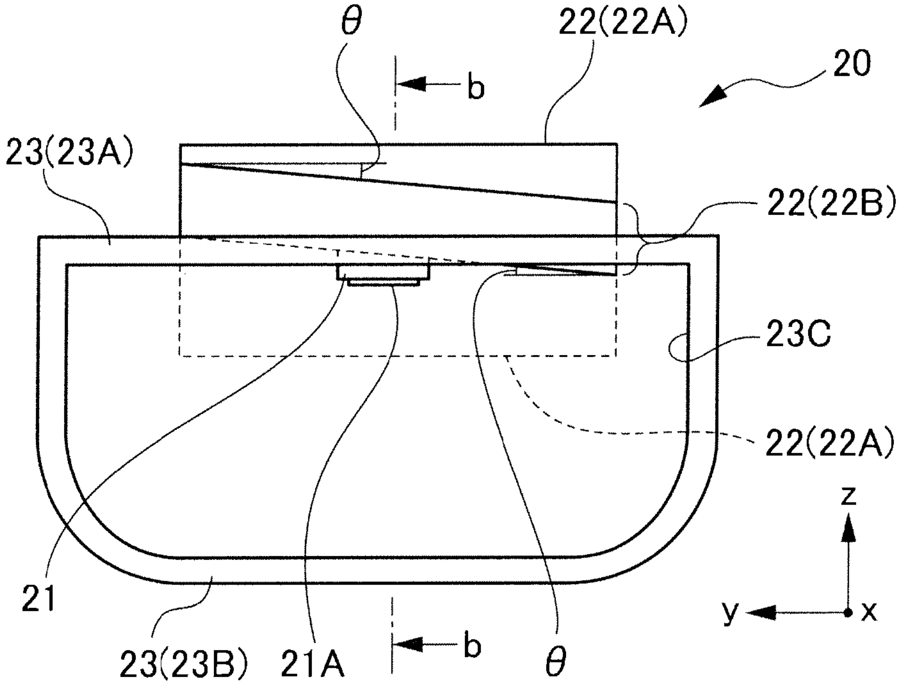
FIG. 6 is a view corresponding to FIG. 1(*a*) and FIG. 1(*b*), and is a view showing another embodiment of the present invention.
Figure 6:
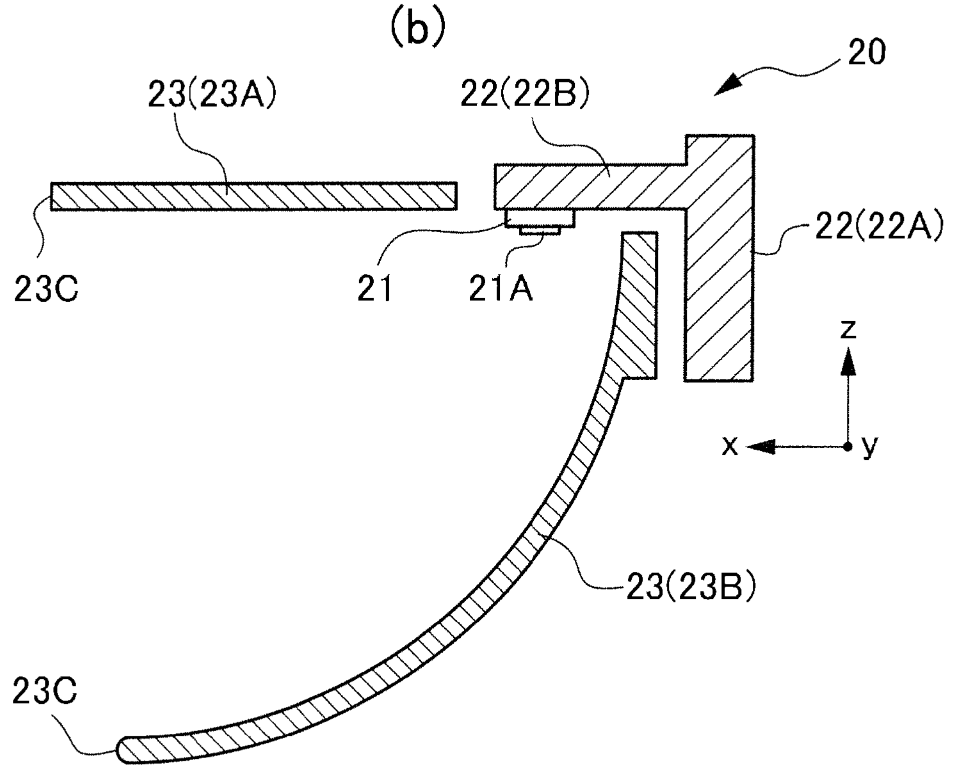

The vehicle lighting device 10 that has been shown in the first embodiment is also shown as a vehicle lighting device that is structured in such a manner that, in a case where the lighting device is mounted on a vehicle, a reflector 23 is disposed upward of the light emitting diode 21. However, without being limitative thereto, it is needless to say that the present invention can be applied to a vehicle lighting device that is structured in such a manner that the reflector 23 is disposed downward of the light emitting geode 21. FIG. 6 is a view showing, in association with FIG. 1, a vehicle lighting device that is structured in such a manner that the reflector 23 is disposed downward of the light emitting diode 21. In this case also, the heat sink 22 is made of the heat sink main body 22A and the light source mount member 22B on which the light emitting diode is disposed; and the light source mount member 22B is made of a plate-shaped member that is protruded from the heat sink main body 22A to the side of the opening 23C of the reflector 23, and in a case where the vehicle lighting device 10 is mounted on the vehicle, the lighting device is disposed so as to tilt at an angle θ with respect to the horizontal surface in the widthwise direction of the vehicle (the x-y plane in the figure).

While the present invention has been described hereinbefore by way of embodiments, it is needless to say that the technical scope of the present invention is not limitative to the scope set forth in the foregoing embodiments. It is self-evident to one skilled in the art that various modifications or improvements can be made for the foregoing embodiments. In addition, it is evident from the subject matters and/or features set forth in the claims that any embodiment for which such modifications or improvements have been made can also be encompassed in the technical scope of the present invention.

What is claimed is:

1. A vehicle lighting device comprising:

a heat sink;

a light emitting element that is mounted on the heat sink; and a reflector that is disposed on a light emission surface side of the light emitting element, the reflector being adapted to reflect in a first direction, light from the light emitting element, wherein:

the heat sink includes a heat sink main body and a plate-shaped light source mount member protruded in the first direction from the heat sink main body, and on which the light emitting element is to be disposed;

wherein the light source mount member is tilted with respect to a horizontal surface in a widthwise direction of a vehicle, when the vehicle lighting device is mounted on the vehicle, and wherein the light emitting element is disposed directly on the light source mount member so that the light emission surface of the light emitting element is substantially flush with the horizontal surface in the widthwise direction of the vehicle when the vehicle lighting device is mounted on the vehicle.

* * * * *